Oct. 29, 1929.  J. P. SPANG  1,733,137
MEAT BROILER
Filed Jan. 10, 1929  2 Sheets-Sheet 1

Inventor.
Joseph P. Spang
by Heard Smith & Tennant.
Attys.

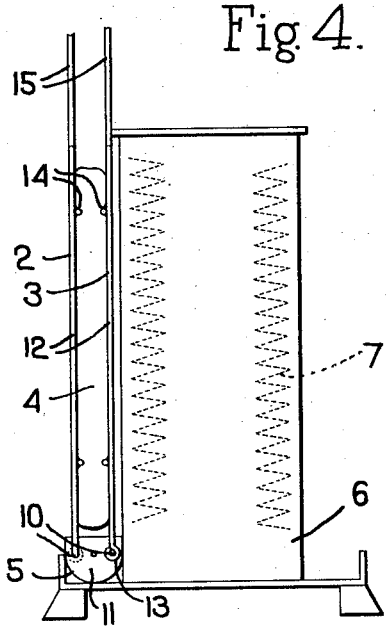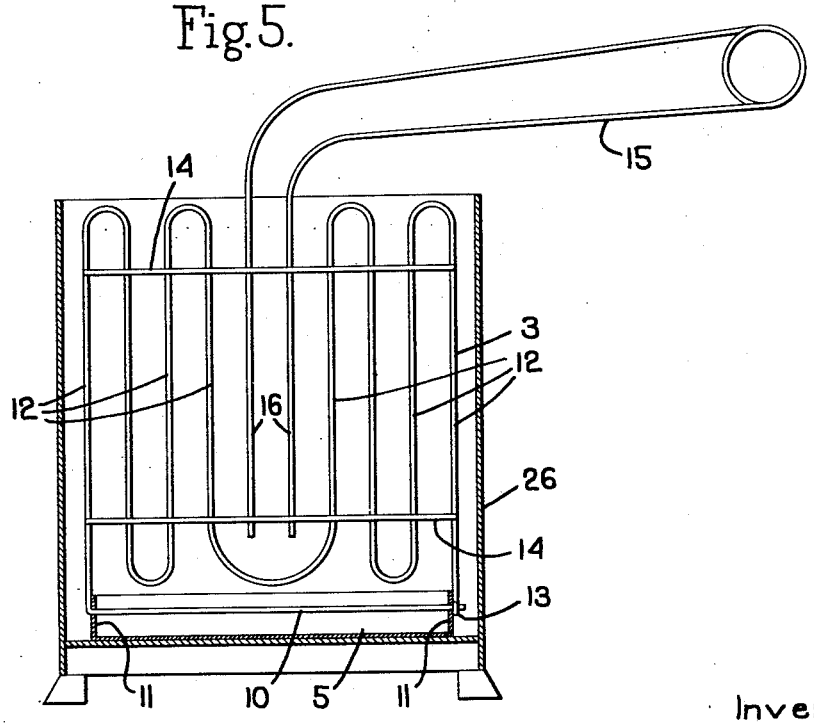

Patented Oct. 29, 1929

1,733,137

UNITED STATES PATENT OFFICE

JOSEPH P. SPANG, OF QUINCY, MASSACHUSETTS

MEAT BROILER

Application filed January 10, 1929. Serial No. 331,471.

This invention relates to a grill for holding meat while being broiled and has for its general object to provide a grill device that is specially designed for use in broiling slices of meat while occupying a vertical position as would be the case if the meat were broiled by means of an ordinary electric toaster.

The device is specially useful in broiling so-called "cube-steak," that is, steak which has been cubed by a machine such as shown in my Patents No. 1,649,991 and No. 1,649,992, both dated November 22, 1927. A slice of steak which has thus been cubed will broil in a very short time and can be conveniently broiled on an ordinary electric toaster.

As stated above the purpose of my present invention is to provide a grill suitable for holding a slice of meat while being broiled on an electric toaster and which is constructed so that any juices which exude from the meat will be caught and will be prevented from dripping onto the toaster.

This end is accomplished by providing a grill device which has the usual two grid elements between which the meat is held and which also has a gutter element located at the lower edge of the grid members and spanning the space between them. In using the meat-broiling device the steak is placed between the two grid members and then the grill with the steak therein is placed in the toaster in the position usually occupied by the bread to be toasted and with the gutter along the under edge of the grill. The meat will be rapidly broiled by the heat generated in the toaster and any juices which run out of the meat will flow into and be caught by the gutter member.

In order to give an understanding of the invention I have illustrated in the drawings a selected embodiment thereof which will now be described after which the novel features will be pointed out in the appended claims.

Figs. 3, 4 and 5 illustrate how the device may be used in an electric toaster, Fig. 5 being a section on the line 5—5, Fig. 3.

A device embodying my invention is in the form of a grill or grid iron 1 comprising the two grid members 2 and 3, between which the steak 4 to be broiled is received. These grid members may be made in various ways without departing from the invention and they are preferably connected together so that they can be opened away from each other to provide for placing a steak between them or removing the steak therefrom and then may be closed together onto the steak during the broiling operation all as usual in grid irons of this type.

The grill or grid iron 1 is provided along one edge with a gutter member 5 which spans the space between the grid members when they are closed onto the steak, the purpose of the gutter being to provide means to catch any juices which may run out of the steak during the broiling operation.

The grill will preferably be made of a size to fit into an ordinary electric toaster such as shown at 6 or 16 although it may be made of any size without departing from the invention.

Figure 3:
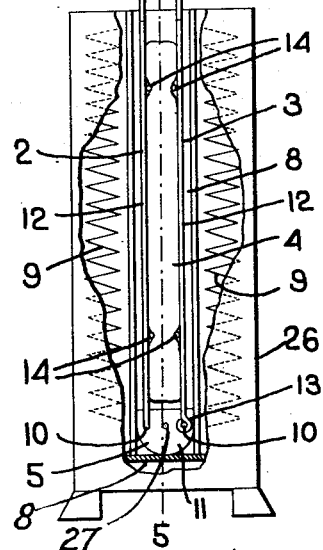

In Fig. 4 the electric toaster 6, which has been shown more or less conventionally, is of the type adapted to toast bread on one side only at a time. This toaster has the vertically-arranged heating elements or coils 7 together with the support 8 for the toast. In Figs. 3 and 5 I have shown at 16 a different type of toaster which is provided with the well 8 into which the toast is adapted to be received, this toaster having the two vertically-arranged heating elements 9 on opposite sides of the well. With this type of toaster both sides of the bread will be toasted at the same time.

My improved grill is designed for use with either type of toaster and when used with the type of toaster shown in Fig. 4 the grill with the meat 4 therein will be laid in upright position against one face of the toaster as shown in said Fig. 4 and with the gutter 5 on the under side. In the form of toaster shown in Figs. 3 and 5 the grill with the meat therein will be placed in the well 8 and with the gutter on the under side. In either case the meat will be rapidly broiled by the heat radiating from the heating coils 7 or 9 and any juices which run out of the meat will be retained in the gutter 5.

The grill may be made in various ways without departing from the invention so long as it is provided with the gutter 5 as shown. In the drawings I have illustrated a grid made of wire which is bent to the proper shape. Each grid member is made of a length of wire which is bent to provide the portion 10 that extends longitudinally of the gutter and passes through the end walls 11 thereof and then is bent to form the connected vertical portions 12, the end of the wire 13 being looped about the end of the portion 10. These vertical portions 12 are shown as connected by cross members 14 which may be welded to the portions 12.

Each grid member is provided with a handle 15 made from a length of wire bent into the proper shape, said wire having the vertical portions 16 which are spot welded to the cross members 14 and having the handle portion 15 which extends laterally as shown.

The gutter 5 may be made of sheet metal which is stamped or pressed into shape and it is hung on the portions 10 of the wire from which each grid is made. Each grid is therefore, pivoted to the gutter and the gutter forms the means for pivotally connecting the grids and holding them properly spaced from each other at the edge where they are pivoted together.

The manner in which the device is used has been set forth above and will be apparent from the drawings. The steak 4 is placed between the grid members as usual in grid irons and then the latter is positioned on the toaster with the gutter 5 on the lower side. Any juices which run out of the meat during the broiling operation will be retained in the gutter and will be prevented thereby from running onto any part of the toaster. The meat which is being broiled is kept out of contact with any part of the toaster by the grid members and hence the broiling of the meat can be accomplished without soiling the toaster.

The gutter 5 not only catches the juices and prevents them from soiling the toaster but also provides means whereby these juices may be preserved for use either on the meat when it is eaten or for making gravy or for other purposes. After the steak has been properly broiled the juices which have collected in the gutter 5 can be readily poured off to be used in any desired way.

Figure 1:
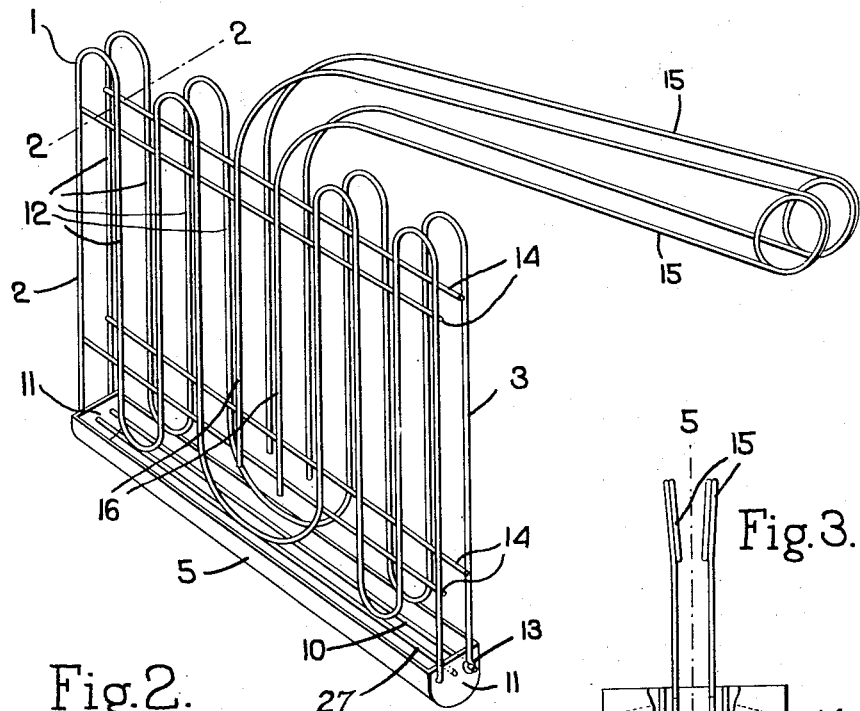
Fig. 1 is a view of a grill embodying my invention.
Figure 2:
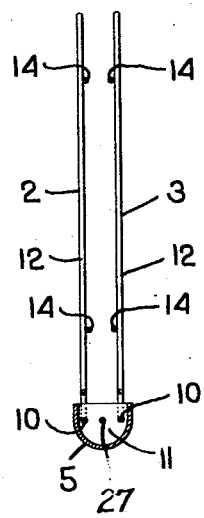
Fig. 2 is a section on the line 2—2, Fig. 1.

In order to prevent the steak 4 from sliding down into the gutter I may provide an additional wire 27 (see Fig. 2) extending from one end to the other of the gutter or I may arrange the two portions 10 of the wire close enough together so as to prevent the meat from slipping down between them. In the latter case the vertical portions 12 of the grid would naturally spring or give somewhat when closed onto the meat.

While I have illustrated herein a grid of a size to fit into a toaster yet I wish it understood that the feature of the gutter may be applied to any grill adapted for broiling meat regardless of the size thereof.

I claim:

1. A grill for broiling meat comprising two grid members adapted to hold between them the slice of meat to be broiled, and a gutter member secured to the grid members along one edge and constituting the means for connecting the grid members to each other.

2. A grill for broiling meat comprising two grid members and a gutter member pivotally connected to each grid member along one edge and thus forming means for pivotally connecting the grid members to each other.

In testimony whereof, I have signed my name to this specification.

JOSEPH P. SPANG.